(12) United States Patent
Kaappa

(10) Patent No.: US 7,809,809 B2
(45) Date of Patent: Oct. 5, 2010

(54) CLIENT PROVISIONING USING APPLICATION CHARACTERISTICS TEMPLATE WITH FLAG PARAMETERS

(75) Inventor: Eero Kaappa, Tampere (FI)

(73) Assignee: Nokia Corporation

( * ) Notice: Subject to any disclaimer, the term of this patent is extended or adjusted under 35 U.S.C. 154(b) by 1547 days.

(21) Appl. No.: 10/756,184

(22) Filed: Jan. 13, 2004

(65) Prior Publication Data

US 2005/0153693 A1 Jul. 14, 2005

(51) Int. Cl.
*G06F 15/177* (2006.01)
(52) U.S. Cl. .................. 709/220; 709/203; 709/228
(58) Field of Classification Search ......... 709/202–203, 709/220–222, 227–228; 707/10
See application file for complete search history.

(56) References Cited

U.S. PATENT DOCUMENTS

| | | | |
|---|---|---|---|
| 6,098,098 A * | 8/2000 | Sandahl et al. ............ 709/221 |
| 6,446,202 B1 | 9/2002 | Krivoshein et al. | |
| 6,629,145 B1 | 9/2003 | Pham et al. | |
| 6,799,204 B1 * | 9/2004 | Baba et al. ................ 709/220 |
| 6,879,979 B2 * | 4/2005 | Hindawi et al. ............. 707/10 |
| 6,938,079 B1 * | 8/2005 | Anderson et al. ........... 709/220 |
| 7,188,160 B2 * | 3/2007 | Champagne et al. ........ 709/220 |
| 7,263,070 B1 * | 8/2007 | Delker et al. .............. 709/227 |
| 7,353,259 B1 * | 4/2008 | Bakke et al. .............. 709/208 |
| 7,610,331 B1 * | 10/2009 | Genske et al. ............. 709/203 |
| 7,610,349 B1 * | 10/2009 | Swinton et al. ............ 709/220 |
| 2002/0059404 A1 | 5/2002 | Schaaf et al. | |
| 2002/0065872 A1 * | 5/2002 | Genske et al. ............. 709/203 |
| 2003/0046345 A1 * | 3/2003 | Wada et al. ............... 709/203 |

FOREIGN PATENT DOCUMENTS

EP 1 555 791 7/2005

* cited by examiner

*Primary Examiner*—Bharat N Barot
(74) *Attorney, Agent, or Firm*—AlbertDhand LLP

(57) ABSTRACT

A method, device, system, and a computer program product where client provisioning is done using a Provisioning Content Document with flag type parameters in an Application characteristics template. The flag concept represents flag-type information that is similar for many applications.

21 Claims, 4 Drawing Sheets

CLIENT PROVISIONING USING APPLICATION CHARACTERISTICS TEMPLATE WITH FLAG PARAMETERS

FIELD OF THE INVENTION

The present invention relates to remote configuration of mobile devices.

BACKGROUND OF THE INVENTION

Client Provisioning is a technology used by carriers, device manufacturers, and corporate IT (information technology) departments to carry out remote configuration of mobile devices on behalf of users. OMA (Open Mobile Alliance) Client Provisioning is a provisioning standard based on sending provisioning information to the client in the form of a Provisioning Content Document. The OMA Provisioning Content Document is divided into several parts called characteristics. These characteristics include PXLOGICAL, NAPDEF, BOOTSTRAP, CLIENTIDENTITY, VENDORCONFIG, APPLICATION and ACCESS. The APPLICATION characteristic is used to define application protocol parameters and to describe the attributes of an application service access point available using the protocol. Different applications require different sets of parameters and the current Provisioning Content Document template is not able to fulfill the requirements of all applications.

The current template does not fulfill the management needs of the different applications because setting parameters vary heavily from one application to another. For example, SIP (Session Initiation Protocol) settings require additional parameters on top of the current template. Other applications might require other settings. Quite often these extra parameters that are required are flag type parameters that can have, for example, the following values: ON/OFF, 0/1, etc. However, conventional systems require that all additional settings be parsed separately to different applications, even if they have the same type of information.

Thus, there is a need for a new flag parameter in the APPLICATION characteristics of a Provisioning Content Document. Further, there is a need to expand the current OMA Provisioning Content Document template for use with applications requiring different settings.

SUMMARY OF THE INVENTION

The present invention is directed to a method, device, system, and a computer program product where client provisioning is done using a Provisioning Content Document with flag type parameters in an APPLICATION characteristics template. The flag concept represents flag-type information that is similar for many applications.

Briefly, one exemplary embodiment relates to a method for client provisioning using an application characteristics template with flag functionality. The method includes receiving a provisioning content document having configuration information for a device from a wireless communication network, parsing the provisioning content document including a plurality of characteristics, and identifying a flag parameter in an application characteristic of the plurality of characteristics in the provisioning content document. The flag parameter indicates whether parameters should be set in the configuration of the device.

Another exemplary embodiment relates to a device that has a client provisioning procedure with flag functionality. The device includes a processor configured to execute programmed instructions. The programmed instructions are configured to instruct the processor to receive configuration information from a wireless communication network, parse the configuration information, and identify a flag parameter in the configuration information. The flag parameter indicates whether certain parameters should be set in the configuration of the device.

Yet another exemplary embodiment relates to a system for client provisioning using an application characteristics template with flag functionality. The system includes a server computer and a client device. The server computer is coupled to a communication network. The client device is coupled to the communication network. The client device has a configuration based on a provisioning content document received from the server computer. This provisioning content document includes a flag parameter that indicates whether certain parameters should be set in the configuration of the device.

Even another exemplary embodiment relates to a computer program product that has computer code to parse configuration information received from a wireless communication network, identify a flag parameter in the configuration information that indicates whether certain parameters should be set in the configuration of the device, and set the certain parameters if the flag parameter so indicates.

Other principle features and advantages of the invention will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION OF EXEMPLARY EMBODIMENTS

Figure 1:
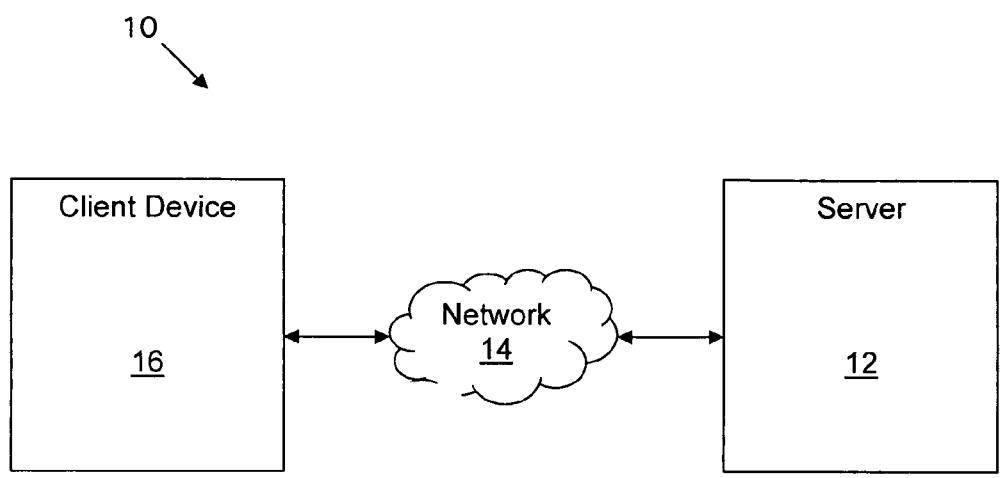
FIG. 1 is a diagrammatic representation of a client provisioning system in accordance with an exemplary embodiment.

FIG. 1 illustrates a client provisioning system 10 including a server 12, a network 14, and a client device 16. The client device 16 communicates with the server 12 via the network 14. In an exemplary embodiment, the client device 16 is a communication device, such as a mobile telephone, and the network 14 is a wireless communication network. Alternatively, the client device 16 can be any kind of computing device.

The client device 16 can be remotely configured from the server 12 over the network 14. In a remote configuration or provisioning process, communication carriers, device manufacturers, or corporate information technology (IT) groups can configure the client device 16 by sending provisioning information over the network 14 to the client device 16. Provisioning information can include information, such as access point (AP) information or multimedia messaging service (MMS) information.

Figure 2:
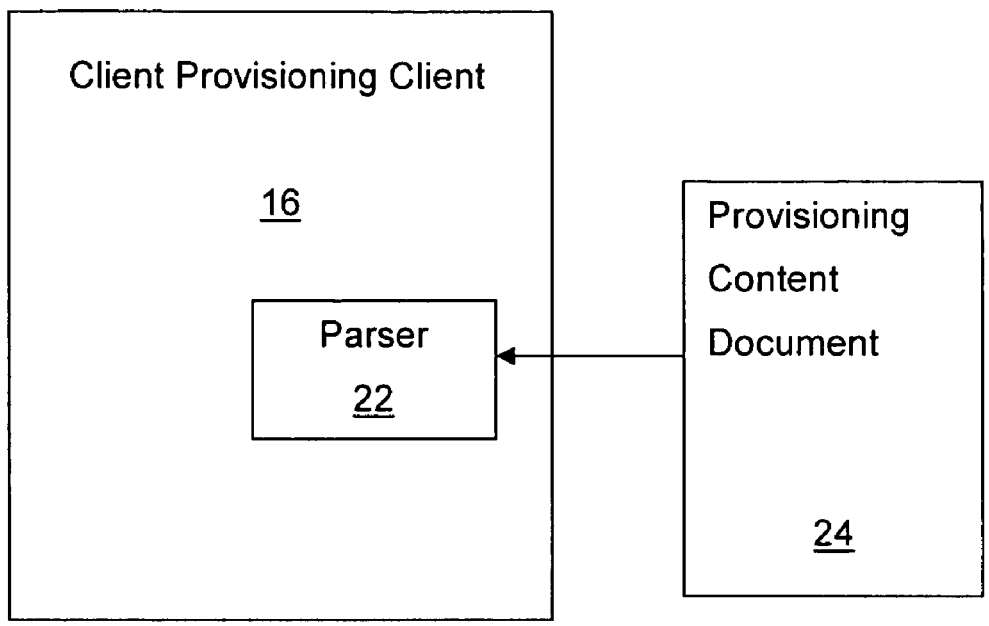
FIG. 2 is a diagrammatic representation of a client provisioning client in accordance with an exemplary embodiment.

FIG. 2 illustrates the client device 16 including a parser 22 that is configured to receive and understand a provisioning content document 24. The provisioning content document 24 includes provisioning information for configuring the client device 16. The provisioning content document 24 is divided into parts called characteristics. The APPLICATION characteristic is used to define application protocol parameters and to describe the attributes of an application service access point available using the protocol.

In an exemplary embodiment, a general flag, such as parm: FLAG * is introduced in all levels of the APPLICATION characteristic. In an alternative embodiment, the flag usage can be limited in only one or more levels. Or, in other words, the flag can be in several, but not all, levels. The following computer code is an example of a general flag embodiment.

characteristic: APPLICATION *

```
{
    parm: APPID
    parm: PROVIDER-ID ?
    parm: NAME ?
    parm: AACCEPT ?
    parm: APROTOCOL ?
    parm: TO-PROXY *
    parm: TO-NAPID *
    parm: ADDR *
    parm: FLAG *
    characteristic : APPADDR *
    {
        parm: ADDR
        parm: ADDRTYPE ?
        parm: FLAG *
        characteristic: PORT *
        {
            parm: PORTNBR
            parm: SERVICE *
            parm: FLAG *
        }
    }
    characteristic : APPAUTH *
    {
        parm: AAUTHLEVEL ?
        parm: AAUTHTYPE ?
        parm: AAUTHNAME ?
        parm: AAUTHSECRET ?
        parm: AAUTHDATA ?
        parm: FLAG *
    }
    characteristic : RESOURCE *
    {
        parm: URI
        parm: NAME ?
        parm: AACCEPT ?
        parm: AAUTHTYPE ?
        parm: AAUTHNAME ?
        parm: AAUTHSECRET ?
        parm: AAUTHDATA ?
        parm: STARTPAGE ?
        parm: FLAG *
    }
}
```

Specific flags can have meanings described in the application-specific OMNA Registration document. The following definitions can be used, for example.

Characteristic/name: APPLICATION/FLAG.
Status: Required.
Occurs: 1/*.
Default value: None.
Used values: N/A.
Interpretation: E.g Takes no values. Get IP address from the server.
Characteristic/name: APPLICATION/FLAG.
Status: Required.
Occurs: 1/*.
Default value: None.
Used values: N/A.
Interpretation: E.g Takes no values. Get IP DNS from the server.

A registration example from these definitions can be as follows:

<parm name="FLAG"/>

In above example, the name of the flag is in all cases is FLAG because the parser pareses the file in the same order that flags are in registration document. However, in alternative embodiments, the name of the flag differs, such as FLAG-X (0 or more entries). The FLAG-X parameter can be used to define common flag type parameter (on/off). X in the parameter name means integer 1-n (FLAG-1, FLAG-2, etc . . . ). As such, there are no values for this parameter. The presence of the parameter indicates that FLAG-X is used, otherwise, the parameter is omitted.

Figure 3:
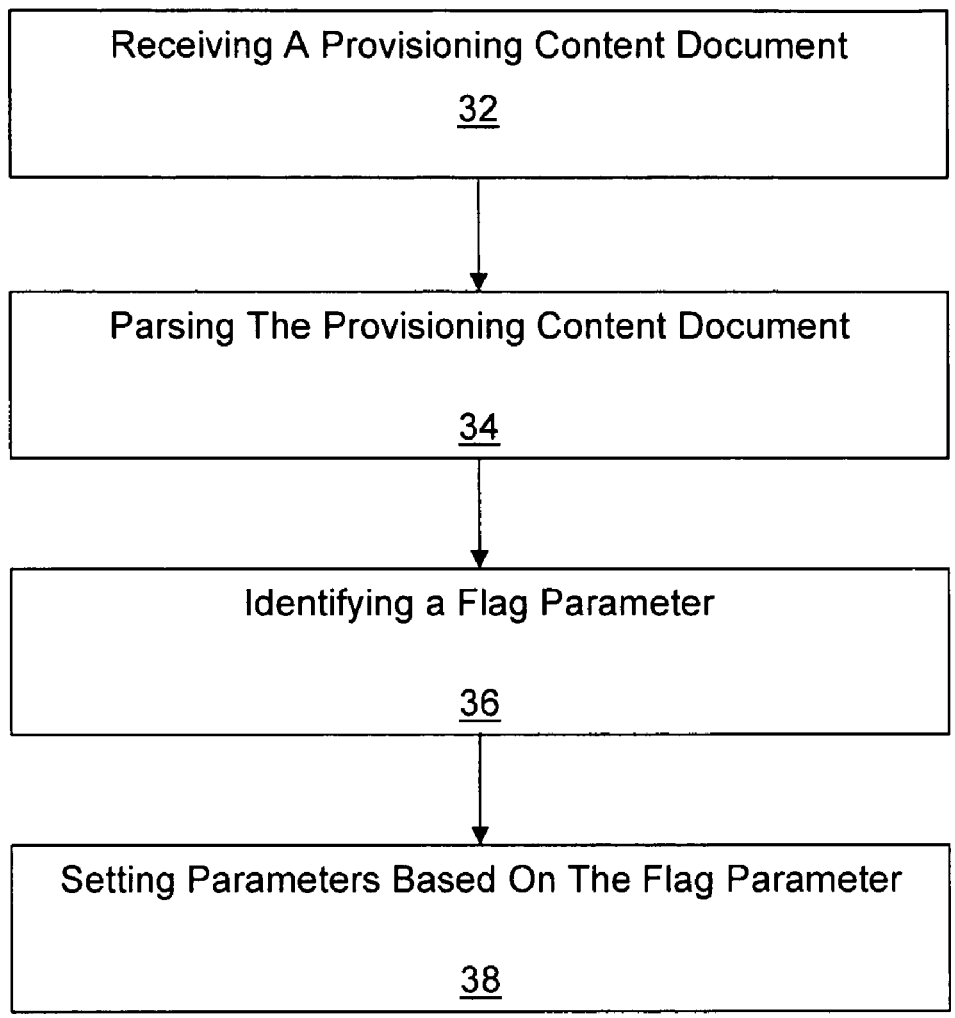
FIG. 3 is a flow diagram of client provisioning using an application characteristics template with flag functionality in accordance with an exemplary embodiment.

FIG. 3 illustrates a flow diagram 30 of exemplary operations in a process of client provisioning using an application characteristics template with flag functionality. Additional, fewer, or different operations may be performed in accordance with alternative embodiments. The template may be used at least for the following applications or protocols: E-mail, Poc, Wireless Village, SIP, Presence, IM, MMS, SMS, Voice Mail, Streaming, Browser, Data Synchronization, Device Management, SWIS, and Chat.

In an operation 32, a device receives a provisioning content document having configuration information from a wireless communication network. The device can receive the provisioning content document as part of a subscriber set up procedure or as part of a configuration procedure for an existing subscriber.

In an operation 34, a processor in the device parses the provisioning content document. The provisioning content document includes a plurality of characteristics. In an operation 36, the processor identifies a flag parameter in an application characteristic of the plurality of characteristics in the provisioning content document. The flag parameter indicates whether parameters should be set in the configuration of the device. In an operation 38, the parameters indicated by the flag parameter are set.

Figure 4:
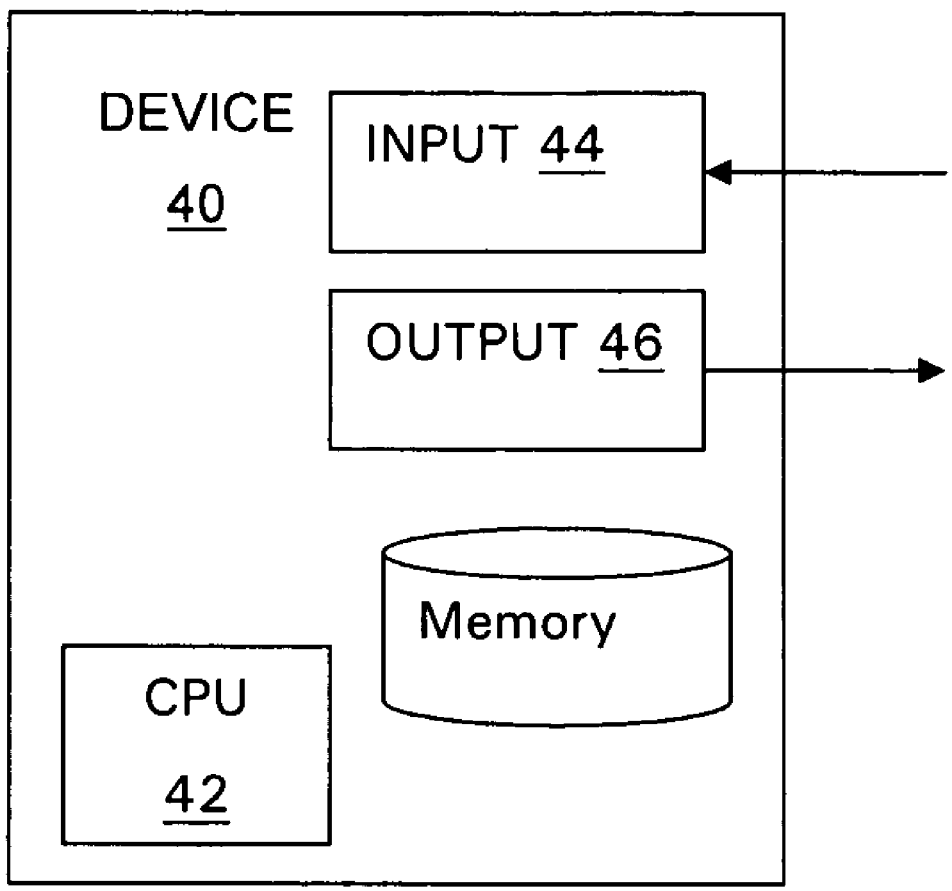
FIG. 4 is a diagrammatic representation of a device in accordance with an exemplary embodiment.

FIG. 4 illustrates a device 40 having a central processing unit (CPU) 42, an input 44, an output 46, and a memory 48. The device 40 can be configured according to provisioning information communicated to it from an outside source to the input 44. The CPU 42 processes the instructions included in the received provisioning information and store information in the memory 48. The device 40 can be a phone, a personal digital assistant (PDA), a computer, or any other device.

Advantageously, these exemplary embodiments simplify the Client Provisioning Framework implementation. Further, the flags make usage of the APPLICATION characteristics template more efficient. Since client provisioning is a push-type technology (i.e., the server doesn't know the client's capabilities), device manufacturers will also benefit from the implementation.

This detailed description outlines exemplary embodiments of a method, device, system, and a computer program product for client provisioning using an application characteristics template with flag functionality. In the foregoing description, for purposes of explanation, numerous specific details are set forth in order to provide a thorough understanding of the present invention. It is evident, however, to one skilled in the art that the exemplary embodiments may be practiced without these specific details. In other instances, structures and devices are shown in block diagram form in order to facilitate description of the exemplary embodiments.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

What is claimed is:

1. A method, the method comprising:
receiving, by a client device, a provisioning content document from a wireless communication network, the provisioning content document comprising configuration information for the client device;
parsing, by the client device, the provisioning content document including a plurality of characteristics; and
identifying, by the client device, a flag parameter in an application characteristic of the plurality of characteristics in the provisioning content document, wherein the flag parameter indicates whether certain parameters are to be set in the configuration of the client device.

2. The method of claim 1, wherein the application characteristic comprises multiple levels.

3. The method of claim 2, wherein the flag parameter is introduced in only one level of the multiple levels of the application characteristic.

4. The method of claim 2, wherein the flag parameter is introduced to all levels of the multiple levels of the application characteristic.

5. The method of claim 1, wherein the flag parameter has a meaning defined in a registration document.

6. The method of claim 1, wherein the flag parameter defines a common flag type parameter such that the presence of the flag parameter indicates that the parameter is used, otherwise, the parameter is omitted.

7. An apparatus, comprising:
at least one processor; and
at least one memory including computer program code, the at least one memory and the computer program code configured to, working with the at least one processor, cause the apparatus to perform at last the following:
receive information from a communication network, the information including configuration information for the device;
parse the configuration information; and
identify a flag parameter in the configuration information, wherein the flag parameter indicates whether certain parameters are to be set in the configuration of the device.

8. The apparatus of claim 7, wherein the apparatus is a mobile telephone.

9. The apparatus of claim 7, wherein the apparatus is a portable computer.

10. The apparatus of claim 7, wherein the configuration of the apparatus is an initial set up by a new subscriber.

11. The apparatus of claim 7, wherein the configuration information includes an open mobile alliance provisioning content document.

12. The apparatus of claim 11, wherein the flag parameter is located at multiple levels of the provisioning content document.

13. The apparatus of claim 7, further comprising a processor configured to set certain parameters based on the flag parameter in the configuration information.

14. A system, the system comprising:
a server computer coupled to a communication network; and
a client device coupled to the communication network, the client device having a configuration based on a provisioning content document received from the server computer, the provisioning content document including a flag parameter, wherein the flag parameter indicates whether certain parameters are to be set in the configuration of the device.

15. The system of claim 14, wherein the flag parameter is included in one level of an application characteristic of the provisioning content document.

16. The system of claim 14, wherein the flag parameter is included in multiple levels of an application characteristic of the provisioning content document.

17. The system of claim 14, wherein the client device is a mobile telephone.

18. A computer program product, embodied on a computer-readable medium, comprising:
computer code, when executed by a processor, causes an apparatus to:
parse configuration information received from a communication network;
identify a flag parameter in the configuration information, wherein the flag parameter indicates whether certain parameters are to be set in the configuration of the device; and
set the certain parameters based on the flag parameter.

19. The computer program product of claim 18, wherein the computer code to parse configuration information received from a communication network comprises computer code to parse an application characteristic of the configuration information.

20. The computer program product of claim 19, wherein the flag parameter is included at one level of the application characteristic.

21. The computer program product of claim 19, wherein the flag parameter is included at multiple levels of the application characteristic.

* * * * *